(12) United States Patent
Sandell

(10) Patent No.: US 10,035,864 B2
(45) Date of Patent: Jul. 31, 2018

(54) CONTROL METHODS AND SYSTEMS FOR POLYMER PRODUCT PURGE

(71) Applicant: ExxonMobil Chemical Patents Inc., Baytown, TX (US)

(72) Inventor: David J. Sandell, Beaumont, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 15/258,226

(22) Filed: Sep. 7, 2016

(65) Prior Publication Data

US 2017/0129969 A1  May 11, 2017

Related U.S. Application Data

(60) Provisional application No. 62/251,446, filed on Nov. 5, 2015.

(30) Foreign Application Priority Data

Jan. 8, 2016 (EP) .................................. 16150559

(51) Int. Cl.

| | |
|---|---|
| *C08F 2/00* | (2006.01) |
| *C08F 10/02* | (2006.01) |
| *C08F 6/28* | (2006.01) |
| *C08F 6/00* | (2006.01) |
| *C08F 2/01* | (2006.01) |
| *B01J 8/24* | (2006.01) |
| *B01J 8/00* | (2006.01) |

(52) U.S. Cl.
CPC ............... *C08F 6/28* (2013.01); *B01J 8/0015* (2013.01); *B01J 8/24* (2013.01); *C08F 2/01* (2013.01); *C08F 6/005* (2013.01); *B01J 2208/00663* (2013.01); *B01J 2208/00973* (2013.01)

(58) Field of Classification Search
CPC ................. C08F 2/00; C08F 2/01; C08F 2/34
USPC ............................................... 526/59, 60, 71
See application file for complete search history.

(56) References Cited

U.S. PATENT DOCUMENTS

| | | | |
|---|---|---|---|
| 3,797,707 A | 3/1974 | Jenike et al. | |
| 4,286,883 A | 9/1981 | Johanson | |
| 4,372,758 A | 2/1983 | Bobst et al. | |
| 4,731,438 A | 3/1988 | Bernier | |
| 4,758,654 A | 7/1988 | Brod et al. | |
| 5,292,863 A | 3/1994 | Wang | |
| 5,462,351 A | 10/1995 | Royal | |
| 8,058,366 B2* | 11/2011 | Sandell .................. | B01J 8/1809 526/64 |
| 8,314,197 B2* | 11/2012 | Chamayou .............. | C08F 6/001 526/348 |
| 8,470,082 B2 | 6/2013 | Blickley et al. | |
| 2005/0154154 A1* | 7/2005 | Battiste .................... | B01J 4/008 526/72 |
| 2007/0036693 A1* | 2/2007 | Vandaele ............. | B01J 19/0033 422/131 |

(Continued)

FOREIGN PATENT DOCUMENTS

EP  2 172 494  4/2010

*Primary Examiner* — Rip A Lee
(74) *Attorney, Agent, or Firm* — Kristina M. Okafor; Leandro Arechederra, III

(57) ABSTRACT

Disclosed herein are methods and systems for purging a polymer product of volatiles. The methods and systems are particularly useful in the purging of a polyethylene polymer product produced in a fluidized bed reactor.

16 Claims, 2 Drawing Sheets

(56) References Cited

U.S. PATENT DOCUMENTS

| | | | |
|---|---|---|---|
| 2011/0201765 A1* | 8/2011 | Odi | C08F 6/003 526/59 |
| 2011/0219952 A1* | 9/2011 | Blickley | B01J 8/005 95/271 |
| 2017/0129969 A1* | 5/2017 | Sandell | C08F 6/28 |

* cited by examiner

CONTROL METHODS AND SYSTEMS FOR POLYMER PRODUCT PURGE

CROSS REFERENCE TO RELATED APPLICATIONS

This application claims the benefit of Ser. No. 62/251,446, filed Nov. 5, 2015, and EP Application No. 16150559.9, filed Jan. 8, 2016, both of which are hereby incorporated by reference in their entireties.

FIELD OF THE INVENTION

This disclosure relates to methods and systems for purging or degassing a polymer product. The methods and systems are particularly useful in the purging of a polymer product comprising polyethylene produced in a fluidized bed reactor.

BACKGROUND OF THE INVENTION

Polyolefin resins, including polyethylene, may be manufactured in various reactor systems, including systems comprising a fluidized bed reactor. In such processes, the polymer product discharged from the reaction zone comprises solid polymer granules and volatiles including unreacted hydrocarbons from the monomer, comonomer, and catalyst. The volatiles may be dissolved in, bound to, or otherwise attached to the polymer granules and/or in the vapor space external to the polymer granules. Heavy olefin monomers often used as comonomers in polyethylene polymerization processes, such as 1-hexene, are especially soluble in low density polyethylene. The process of reducing the volatiles down to acceptable levels in the polymer product is referred to in the art as resin degassing or purging.

A polymer product may be purged by depressurizing the resin and stripping it with a light purge gas, such as nitrogen. In these processes, the polymer product is transferred to a lower pressure purge bin. The polymer product enters the upper portion of the vessel and is subjected to purge gas entering the vessel through ports or openings at the bottom of the vessel and possibly along the sides and other areas. It sweeps through the granular resin and exits the purge bin. The purged polymer product is discharged and conveyed to further downstream processes, while recovered hydrocarbons are swept out in the purge gas and may be recycled back to the reactor. Background references for polymer purge systems include U.S. Pat. Nos. 3,797,707; 4,286,883; 4,372,758; 4,731,438; 4,758,654; 5,292,863; 5,462,351; 8,470,082, U.S. Patent Application Publication No. 2011/0201765, and EP 2 172 494 A.

Effective and efficient purging is important for safety and environmental reasons. The volatiles must be removed or reduced to an appropriate level before the polymer product is exposed to the atmosphere. Additionally, it is economically advantageous to recover as much of the hydrocarbons as possible, to minimize the use of additional raw materials and compression and pumping energy. However, unpredicted or undetected events could occur in a polyolefin reactor system and affect purge performance. For example, during a reactor upset in a fluidized bed reactor, polymer sheets or chunks could be produced and transferred from the reactor to the purge bin. These sheets and chunks within the purge bin could lead to poor distribution of the purge gas, reducing purge performance. Without a good method or system for modeling purge performance, these events may go unrecognized and lead to substantial problems with downstream equipment and processing, as well as product quality and transport.

It is very challenging to create useful and accurate models of purge systems, to predict the variables that affect purging, and to determine when an undetected event in the reactor system is affecting purge performance. Conventionally, it has been thought based on well-known diffusion mechanisms that purge efficiency depended on the size of the polymer granules in the polymer product, and could thus be improved by reducing the diameter of the polymer granules. It is not always desirable or possible, however, to reduce the diameter of the polymer granules being produced. Furthermore, models incorporating a presumed relationship between purge efficiency and polymer granule size have shown to be inaccurate in modeling purge performance in some systems.

Other purge models have focused on finding a relationship between the concentration of volatiles at the inlet of the purge bin and at the exit of the purge bin. The output of these models has typically suggested that this relationship is only weakly correlated to the mass flow rate of purge gas in the purge bin. Thus, these models typically indicate that a very large purge bin is required to achieve a given purge efficiency, rather than providing useful information on other variables that may be more readily changed to impact purge efficiency.

There is a need for more useful and accurate methods for modeling purge system behavior, and for models that more accurately predict purge performance and the impact of changes to relevant variables. There is a need for models that can provide real-time information on events within the reactor system that are affecting purge performance and for improved purge systems useful with those models.

SUMMARY OF THE INVENTION

Disclosed herein are methods for purging a polymer product of volatiles, the methods comprising producing the polymer product in a reactor, transferring the polymer product from the reactor to at least one purge bin, injecting a purge gas into the at least one purge bin to create a purged polymer product, discharging the purged polymer product from the at least one purge bin, and determining a relationship between purge efficiency, $X_o/X_i$, and $(S*P)/G$ for one or more species of volatile purged from the polymer product. The parameter $X_o$ is the concentration in ppmw of the volatile species in the discharged purged polymer product and $X_i$ is the concentration in mol % of the hydrocarbon species in a gas phase of the reactor upstream of the purge bin. The parameter S is the production rate in Klb polymer per hour of the reactor, while P is the absolute pressure in psia within the purge bin, and G is the mass flow rate in lb purge gas per hour in the purge bin. While specific units of measure are included herein for consistency and convenience, one of ordinary skill in the art would readily recognize that the relationship between purge efficiency and $S*P)/G$ and other calculations disclosed herein could be determined using other units of measure within the scope of the invention as claimed.

Also disclosed herein are systems for purging a polymer product of volatiles, the systems comprising a reactor system adapted to produce a polymer product, at least one purge bin, a system for transferring the polymer product from the reactor system to the at least one purge bin, a system for injecting a purge gas into the at least one purge bin to create a purged polymer product, a first analyzer for measuring the concentration of volatile species in the vapor space of the purged polymer product, and a second analyzer for measuring the concentration of at least one volatile species in a gas phase of the reactor system upstream of the purge bin.

The methods and systems herein are particularly useful in the purging of a polymer product comprising polyethylene produced in a fluidized bed polymerization reactor.

DETAILED DESCRIPTION

Figure 1:
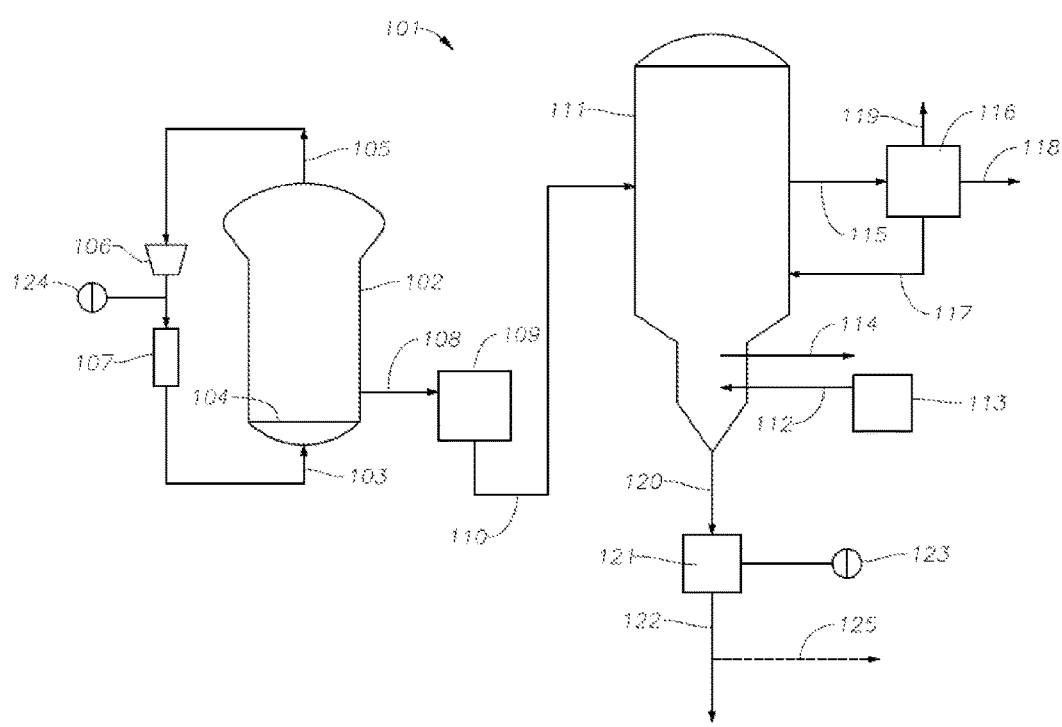
FIG. 1 is a fluidized bed reactor system and purge system suitable for use with the methods and systems of the invention disclosed herein.

The term "purge" as used herein refers to the process of removing unwanted dissolved and undissolved gases, including hydrocarbons and/or other volatiles, from a solid granular polymer resin that has interstitial space filled with gas. In addition to the interstitial gas, hydrocarbons may be dissolved in the resin. The purging operation consists of creating a sufficient driving force to cause the absorbed hydrocarbon to diffuse from the resin.

The term "volatiles" as used herein refers to a component or compound that has a low relative boiling point compared with the components or compounds around it. Illustrative volatiles include, but are not limited to, hydrocarbons, nitrogen, water, ammonia, methane, carbon dioxide, and all compounds of oxygen, carbon, and hydrogen.

The volatiles in a polymer product may include unreacted monomer and comonomer and other impurities introduced to the reactor system with the monomer, comonomer, or other feed or produced as byproducts of the polymerization reaction. Purging efficiency is often limited by the heavier volatile species in the polymer product. In a process to produce a polyethylene copolymer, for example, where a hexene comonomer is used, the polyolefin product will include unreacted ethylene and hexene, as well as other impurities that were introduced to the reactor system with the ethylene and hexene or other feed. These volatile impurities could be saturated or unsaturated, inerts or non-inerts, and could include heteroatoms. In a process to produce a polyethylene copolymer with a hexene comonomer, purging efficiency will often be limited by notable amounts of the heavier $C_5$ and $C_6$ inerts and non-inerts within the polymer product, including alkanes, alkenes, alcohols, and other species.

Useful and accurate methods for evaluating purge efficiency in the purging of a polymer product of volatiles have been discovered. The methods involve the determination of a relationship between purge efficiency, $X_o/X_i$ and $(S*P)/G$ for one or more species of volatile purged from the polymer product. The parameter $X_o$ is the concentration in ppmw of the volatile species in the discharged purged polymer product and $X_i$ is the concentration in mol % of the volatile species in a gas phase of the reactor upstream of the purge bin. The parameter S is the production rate in Klb polymer per hour of the reactor, while P is the absolute pressure in psia within the purge bin, and G is the mass flow rate in lb purge gas per hour in the purge bin. This model has been successfully applied to the purging of polymer products, including polyethylene copolymers, produced in a fluidized bed reactor. While specific units of measure are included herein for consistency and convenience, one of ordinary skill in the art would readily recognize that the relationship between purge efficiency and $S*P)/G$ and other calculations disclosed herein could be determined using other units of measure within the scope of the invention as claimed.

The molecular weight of the purge gas used may also be considered in the purge model disclosed herein. Where the purge gas used is always the same compound across product grades or systems (e.g. always nitrogen), the model may be simplified to exclude this parameter. Where the purge gas is a different compound across product grades or systems, the model may involve the determination of a relationship between purge efficiency, $X_o/X_i$, and $(S*P*M)/G$ for one or more species of volatile purged from the polymer product. In this case, $X_o$, $X_i$, S, P, and G are as described above and M is the molecular weight of the purge gas in lb/lb-mol.

Improved systems for purging a polymer product of volatiles have also been discovered. The systems comprise a reactor system adapted to produce a polymer product, at least one purge bin, a system for transferring the polymer product from the reactor system to the at least one purge bin, a system for injecting a purge gas into the at least one purge bin to create a purged polymer product, a first analyzer for measuring the concentration of volatile species in the vapor space of the purged polymer product, and a second analyzer for measuring the concentration of at least one volatile species in a gas phase of the reactor system upstream of the purge bin.

The systems may further include a screen for screening the purged polymer product. The first analyzer may be adapted to measure the total concentration of volatile species in the vapor space of the purged polymer product as the purged polymer product flows through the screen. Such systems are particularly useful where the reactor system comprises a fluidized bed reactor having a cycle gas loop. In such systems, the second analyzer may be adapted to measure the concentration of the at least one volatile species in the cycle gas of the fluidized bed reactor. The systems may further comprise a heater or heat exchanger for heating the polymer product, wherein the heater or heat exchanger is located between the reactor and the at least one purge bin. Any suitable equipment may be used for the first and second analyzers. For example, either analyzer may include a gas chromatograph, a headspace gas chromatograph, or a mass spectrometer. One or both of the first and second analyzers may be adapted to measure the concentration in real time.

Conventionally, it has been thought, based on well-known diffusion mechanisms, that purging efficiency depended on the size of the polymer granules in the polymer product, and that purge efficiency could thus be improved by reducing the diameter of the polymer granules. It is often not possible or desirable to reduce the diameter of the polymer granules. It has advantageously been determined, using the methods and systems disclosed herein, that similar purging efficiencies can be achieved with larger polymer granules as are achieved with smaller polymer granules, by appropriately controlling the variables that have been determined to substantially impact purge performance.

Prior purge models have also focused on finding a relationship between the concentration of volatiles at the inlet of the purge bin and at the exit of the purge bin, and the output of these models has typically suggested that this relationship is only weakly correlated to the mass flow rate of purge gas in the purge bin. In the presently disclosed model, it has been found that purge efficiency, $X_o/X_i$, is strongly correlated to $(S*P)/G$ or $(S*P*M)/G$.

It is also believed that prior models of purge systems have not been accurate or useful in part because the concentration of volatiles at the inlet of the purge bin on a species-level cannot be readily determined. Furthermore, environmental reporting requirements lead to measurement and reporting of volatiles concentration in total, rather than by species. The model disclosed herein is applied on a species-level to one or more of the species of volatiles to be purged from the polymer product. A species, as used herein, is any one compound or group of compounds of volatiles within the polymer product that is less than the whole of all of the species of volatiles to be purged from the polymer product. For example, a species may be one compound, such as 1-hexene. In such an embodiment of the invention, the purge efficiency, $X_o/X_i$, for that species is calculated with $X_o$ as the concentration in ppmw of 1-hexene in the discharged purged polymer product and $X_i$ as the concentration in mol % of 1-hexene in a gas phase of the reactor system upstream of the purge bin. A species, as used herein, may also be more than one compound or a group of compounds. The group of compounds may be related in some way or not related, but may be considered a species so long as the group is less than the whole of all of the species to be purged. For example, a species could be "$C_6$ inerts," which would include all volatile species in the polymer to be purged having six carbon atoms that are inert to the polymerization process. The particular selection of species of volatiles to apply the model to that will be most useful in a particular process could be readily made by one of ordinary skill in the art in possession of this disclosure. Preferably, the selection of species includes the particular volatile species that have been determined to be most limiting to purge efficiency, which are often the heavier species present in a given process.

Different polymer products are known to purge at different purge efficiencies, depending on the polymer density, polymer granule size, temperature, catalyst used, and other factors. Once the relationship between purge efficiency, $X_o/X_i$ and $(S*P)/G$ or $(S*P*M)/G$ is understood for a given resin, one can understand how to set process conditions to achieve the desired purge efficiency with that resin. If a given resin is determined to have relatively poor purge efficiency, one can adjust at least one of the parameters S, P, M, or G to improve purge efficiency. For example, one could increase G, the mass flow rate of purge gas in the purge bin, to increase purge efficiency. Additionally or alternatively, one could decrease S, the production rate of polymer in the reactor, or decrease P, the absolute pressure in the purge bin, to increase purge efficiency. In a preferred embodiment of the invention, $(S*P)/G$ or $(S*P*M)/G$ is maintained at a constant value, and/or maintained at or below a target value during purging of a particular resin grade. The mass flow rate of purge gas, G, is preferably maintained below a minimum fluidization velocity for the purge bin, which may be readily determined using any suitable method.

Even gas and resin flow distribution within the purge bin are important to practicing the invention disclosed herein, since misdistribution of either could strongly impact the $(S*P)/G$ or $(S*P*M)/G$ factor. A mass or plug flow pattern is important. The ability to achieve mass or plug flow depends on the purge bin design, resin variables (such as stickiness and level of fines), and the presence of flow obstructions. Purge gas within a purge bin typically distributes well when the bin is appropriately designed and process parameters are appropriately selected, and in the absence of flow obstructions such as large sheets or chunks of polymer or other material.

It has also been determined that temperature of the polymer product strongly impacts purge efficiency, with a higher temperature generally improving purge efficiency. The purge efficiency can be improved substantially by increasing the temperature of the polymer product by only a few degrees centigrade. Thus, the methods and systems herein may include heating the polymer product after it is discharged from the reactor and before it is transferred to the purge bin. This heating may be accomplished by any suitable method, such as through the use of a heater, heat exchanger, steam jacket, or otherwise.

A portion of the purge gas may be recovered and recycled to the purge bin. When recycled purge gas is used to offset the use of fresh purge gas, the recycled purge gas should contain no significant amount of heavy volatiles. Thus, the recovered purge gas may be processed to remove at least a portion of the hydrocarbon volatiles comprising four, five, six, or more carbon atoms prior to recycling it to the purge bin. This removal may be done outside of the purge bin, in a vent recovery unit, for example. The recovered purge gas may also be processed to remove at least a portion of the light volatiles, such as hydrocarbons comprising three or less carbon atoms. The removal of light volatiles may be done in the purge bin itself. Multiple diameter purge bins, comprising a top section and a bottom section (and, optionally, additional sections) are commonly used. In a multiple diameter purge bin, the removal of the light volatiles in the recovered purge gas may be done in the bottom section of the purge bin using a sweep of fresh, clean purge gas.

For some polymer products, simple stripping with a dry gas is not sufficient to remove the bound volatiles. These volatiles may be unbound by injecting small amounts of steam into the purge bin. The steam is thought to help neutralize reactive components in the polymer product, such as catalyst particles or aluminum alkyls (the latter often used as activators in certain polymerization processes), which helps free the volatiles. Injection of steam to the purge bin may be accomplished by any suitable method. In a preferred embodiment, steam is added to heated nitrogen to prevent condensation. If condensation does occur, it can degrade the effectiveness of moist purging.

Product Purge System

FIG. 1 shows a fluidized bed reactor system 101 comprising a fluidized bed pressure vessel 102. A gas or gas/liquid mixture enters the fluidized bed pressure vessel 102 from an inlet 103, through a gas distributor 104, and exits the fluidized bed pressure vessel 102 through cycle fluid line 105. The fluidized bed pressure vessel 102 may be a reactor, a polymerization reactor, a vessel capable of holding a fluidized solid, or any pressure vessel from which a granular, powder, or particulate solid product may be removed. The cycle fluid line 105 exits the top of the reactor and is compressed in compressor 106 and then passed through heat exchanger 107, where heat is removed from the cycle fluid. After cooling, all or a portion of the cycle fluid line 105 can be returned to the reactor.

Polymer product is recovered from the reactor via line 108 and sent through the product discharge system 109. The product discharge system 109 can be any suitable system. Product discharge systems and operating methods particularly useful herein are disclosed in U.S. Pat. No. 9,039,333. The polymer product exits the product discharge system 109 via line 110, and is fed to a purge bin 111. Although only one inlet 103 to the purge bin 111 is shown in FIG. 1, multiple inlets and outlets are possible, in any suitable configuration. The purge bin 111 may be any suitable vessel or bin, including multiple diameter purge bins having an upper zone, a lower zone, and optionally one or more intermediate zones, such as are described in U.S. Pat. No. 4,758,654, which is herein in entirety incorporated by reference. Other purge bin designs suitable for use may include those disclosed in U.S. Pat. No. 8,470,082, which is herein incorporated in entirety by reference. The purge bin 111 may include one or more inserts for gas distribution (not shown), which may be an inverted cone or other suitable design. The inverted cone may have any cross-sectional shape, such as round, oval, polygonal, or other, and may have a pointed tip, rounded tip, or square tip.

A fresh purge gas stream 112 is fed to the bottom of the purge bin 111 from purge gas source 113. The fresh purge gas stream 112 may be nitrogen or another suitable purge gas for the process. A volatiles stream 114 is removed the bottom of the purge bin 111 and may be further processed or sent to a flare (not shown). This volatiles stream 114 may comprise light volatiles, such as hydrocarbons comprising three or less carbon atoms, introduced into the purge bin from the use of recycled purge gas.

Purge gas sweeps up through the polymer product in the purge bin 111 and is removed via discharge line 115. It is sent to a purge gas recovery system 116. In the purge gas recovery system 116, at least a portion of the purge gas is separated and recycled back to the purge bin 111 through purge gas recycle line 117. Purge gas recycle line 117 is optionally supplemented with fresh purge gas. The recovered purge gas in purge gas recycle line 117 may also include a portion of light volatiles, as discussed above. The light volatiles may be separated and removed from the recovered purge gas in the bottom section of the purge bin 111. Some components of the used purge gas may exit the purge gas recovery system 116 in the liquid phase through liquid discharge line 118, and be sent for sent for further processing or appropriately disposed. Additionally, some components of the used purge gas may be sent directly to a flare through flare line 119.

The purged polymer product exits the bottom of the purge bin 111 through polymer product discharge line 120. Optionally, the purged polymer product is fed through a screen 121 upon exit of the purge bin 111, prior to being sent downstream for further processing via purged polymer product discharge line 122.

A first analyzer 123 may be adapted to measure the total concentration of volatiles in the vapor space of the purged polymer product as the purged polymer product flows through the screen. This first analyzer 123 is preferably an inline analyzer, providing real time data on the total concentration of volatiles in the vapor space. A second analyzer 124 may be adapted to measure the concentration of the at least one volatile species in the cycle gas of the fluidized bed reactor. This second analyzer 124 is also preferably an inline analyzer, providing real time data. Any suitable equipment may be used for the first and second analyzers. For example, either analyzer may include a gas chromatograph, a headspace gas chromatograph, or a mass spectrometer. A sample of the purged polymer product may be taken from polymer sample point 125 and sent to a laboratory for determination of $X_o$, the concentration in ppmw of one or more volatile species in the discharged purged polymer product, as described further below.

EXAMPLES

Multiple Headspace Extraction Method

The parameter, $X_o$, the concentration in ppmw of one or more volatile species in the discharged purged polymer product, may be determined using stepwise gas extraction at equal time intervals, referred to as "Multiple Headspace Extraction" (MHE) with intermediate headspace analysis, as described further below. The total content of the volatile species in a sample vial (equal to the amount originally dissolved in the purged polymer product sample) is determined by the addition of the peak areas resulting from each extraction step. Additional information on this method is available in Ettre et al., American Laboratory, 15 (19), 76-83 (1983), which is herein incorporated in entirety by reference. Any other method shown to be accurate for determining speciated volatiles concentration in a polymer product may also be used.

Application of the MHE method is explained below, with 1-hexene as the volatile species being analyzed. A small (1-2 gm) sample of purged polymer product is taken from the discharge of the purge bin and placed in a headspace vial (e.g., 20 ml, available from Perkin Elmer, Inc.) which is then quickly sealed with a septum and secured against pressure by crimping an aluminum cap on it. A calibration sample is prepared by injecting 2 µL of 1-hexene into another headspace vial.

An automatic headspace sampler, such as an Agilent 7694E Headspace Sampler, available from Agilent Technologies, is used in the MHE mode for the headspace analysis. The headspace vials containing both the purged polymer product and the calibration sample are heated for about 30 minutes at about 100° C. The elevated temperature causes a substantial fraction of the 1-hexene in the purged polymer product sample to desorb from the resin into the gas phase of the vial. The gas phases of both vials are then sampled to a gas chromatograph, with four extraction steps for each vial, to determine the 1-hexene content. Four peak areas each were thus obtained for both the purged polymer product sample and the calibration sample, from which the total area was calculated.

The chromatographic analysis may be carried out using a Sigma 2000 Gas Chromatograph, available from Perkin Elmer, Inc., equipped with a flame ionization detector (FID), or other suitable chromatographic equipment. A Hewlett Packard Chromatography Data System Model 3357, or other suitable system, may be used in conjunction. A complete set of chromatographic and headspace analysis conditions, suitable for this analysis, are provided in Table 1 below.

TABLE 1

Chromatographic and Headspace Analysis Conditions for 1-Hexene Analysis in Polyethylene Samples

| Column | |
|---|---|
| Column Type | Open Tubular (Capillary) |
| Dimensions | 60 m × 0.25 mm I.D. |
| Liquid Phase | Durabond-1 |
| Film Thickness | 1.0 µm |
| GC Conditions | |
| Initial Column Temperature | 60° C. (5 min. hold) |
| Rate of Temperature Program | 30° C./minute |
| Final Column Temperature | 225° C. (5 min. hold) |
| Carrier Gas | Helium |
| Inlet Pressure | 20 psig |
| Split Flow | 50 mL/minute |
| FID Temperature | 275° C. |
| FID Range | X1 |
| Analysis Time | 15.5 minutes |
| Headspace Conditions | |
| Vial Temperature | 100° C. |
| Thermostatting Time | 30 minutes |

TABLE 1-continued

Chromatographic and Headspace Analysis Conditions
for 1-Hexene Analysis in Polyethylene Samples

| | |
|---|---|
| Transfer Temperature | 130° C. |
| Pressurization Time | 0.5 minutes |
| Injection Time | 0.10 minutes |
| Withdrawal Time | 0.20 minutes |
| Mode of Operation | 4-step MHE |

The theoretical background of the MHE method is explained as follows. If a liquid or solid sample is in equilibrium in a sample vial with the gas phase (the headspace) above it, the ratio of the concentrations of volatile components in the gas phase, $C_V$, and in the sample, $C_S$, will correspond to a partition coefficient, k, of the component between the two phases:

$$k = C_S/C_V \quad (1)$$

If a headspace sample is taken out of the gas phase of the vial, then after re-equilibration between the two phases, the concentration of the particular compound in both phases will be smaller than originally. However, their ratio (the partition coefficient) remains constant. If another sample is taken from the headspace, the corresponding peak area will be smaller than the peak area of the first sample. Continuing this, with each sample a smaller peak is obtained until finally all of the volatile compound is exhausted. The sum of all peak areas corresponding to the given compound will correspond to the total amount of that substance present in the original sample. Thus, by separately establishing the peak area corresponding to a known amount of the substance, the total amount present in the unknown sample can be calculated.

There is no need to repeat sampling until all of the given compound is eliminated, however. The reason is that the decrease in concentration follows the mathematical relationship of a first-order reaction. Therefore, the sum of the peak areas corresponding to the total amount present can be calculated from several successive determinations. According to the mathematical description of a first-order reaction, the decrease in concentration with time is proportional to the prevailing concentration:

$$-dC/dt = mC \quad (2)$$

where C is the concentration, t is time, and m is a constant.

The concentration at any time, t, thus depends on the initial concentration, Co, and the exponent m:

$$C_i = c_o e^{-mt} \quad (3)$$

With the gas extraction performed in a stepwise mode as in the MHE method, at equal time intervals, the time t may be replaced by n, the number of extraction steps. Since peak area is proportional to concentration, the initial concentration, $C_o$, may be replaced by the peak area from the first extraction step ($A_1$ at n=1) and t can be replaced by n−1. In other words, if t=0, then n=1:

$$A_i = A_1 e^{-m*(n-1)} \quad (4)$$

In equation 4, the constant m of equation 3 is replaced by the constant m*, which also includes some instrumental parameters. Equation 4 can be written in the following form:

$$\ln A_i = -m*(n-1) + \ln A_1 \quad (5)$$

Equation 5 is a linear equation of the y=ax+b type, where y=ln $A_i$ and x=m*. Thus, with a regression analysis, the value of m* (the slope of the linear plot) can be calculated from a few, i.e. three to four, determinations.

The total amount of the volatile compound present in the sample is obtained from the sum of all peak areas. The sum of the peak areas corresponds to the following geometric progression:

$$\Sigma A_i = A_1[1 + e^{-m*} + e^{-2m*} + \cdots + e^{-(n-1)m*}] \quad (6)$$

which may also be written as:

$$\Sigma A_i = A_1/1 - e^{-m*}) \quad (7)$$

The regression analysis should have at least three determinations.

The dissolved 1-hexene content may be calculated from the following equation:

$$\text{PPM (Dissolved 1-hexene)}^2 = \frac{S_A * I_W * 10^6}{I_A * S_W}$$

where:

$S_A$ is the peak area of 1-hexene in the purged polymer product sample, $I_W$ is the weight of 1-hexene (mg) in the calibration sample, $I_A$ is the peak area of 1-hexene in the calibration, and $S_W$ is the weight of the purged polymer product sample.

One of ordinary skill in the art would readily recognize that variations of this procedure may be suitable and appropriate depending on the volatile species being analyzed.

Analysis of Polyethylene Copolymers

Two polyethylene copolymers were produced in a gas phase fluidized bed reactor using a 1-hexene copolymer using two different metallocene catalysts. The first polyethylene copolymer had a density of 0.916 g/cc and was produced using a silica supported bis(propylcyclopentadienyl) hafnium dimethyl catalyst activated with methylaluminoxane ("Catalyst A"). The second polyethylene copolymer had a density of 0.920 g/cc and was produced using a silica supported dimethylsilyl bisindenyl zirconium dichloride catalyst activated with methylaluminoxane ("Catalyst B").

Figure 2:
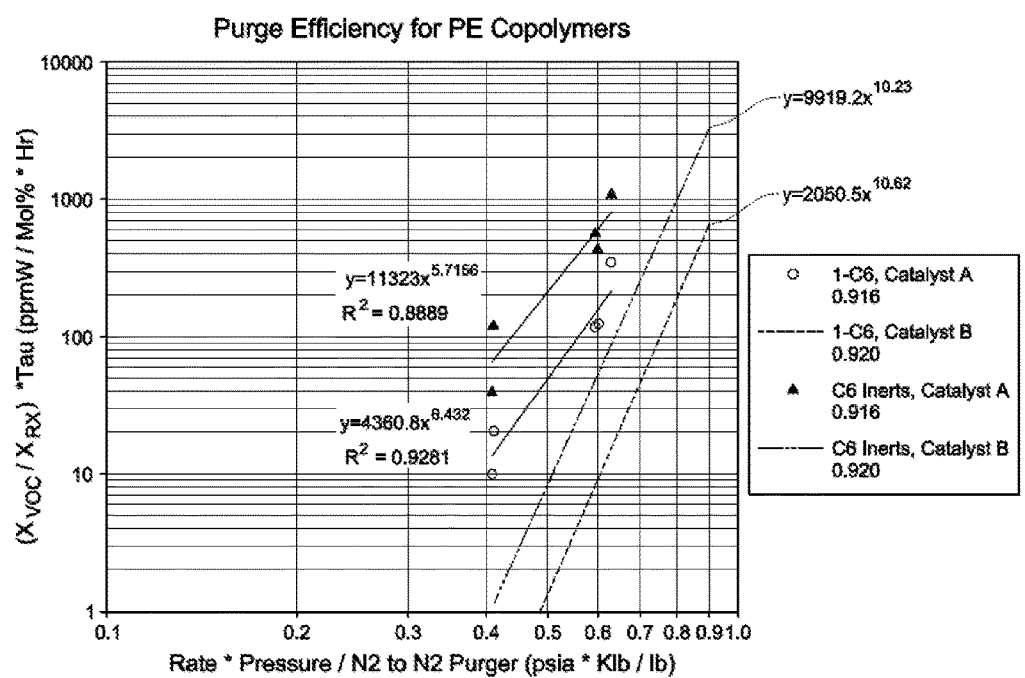
FIG. 2 is plot of purge efficiency, $X_o/X_i$, versus $(S*P)/G$ for $C_6$ species purged from polyethylene copolymer resins produced in a fluidized bed reactor using a 1-hexene comonomer and a metallocene catalyst.

Purged polymer product samples were taken at different purge bin conditions and analyzed. A relationship between purge efficiency, $X_o/X_i$, and (S*P)/G for different species of volatile purged from the polymer product mixture was and plotted on a graph as shown in FIG. 2. Nitrogen was used as the purge gas in each of these examples, so the model was simplified such that M, the molecular weight of the purge gas in lb/lb-mol, was not considered. Two different species of volatile were analyzed. One species was a single compound, 1-hexene ("1-C6" in FIG. 2). The second species was a group of compounds that included all compounds having six carbon atoms that were inert to the polymerization process ("C6 Inerts" in FIG. 2). The C6 Inerts included compounds such as hexane, 3-methyl-2-pentene, cis- and trans-2-hexene, cis- and trans-3-hexene, 4-methyl-2-pentene, and 2-ethyl-1-butene.

In FIG. 2, $X_{VOC}$ is $X_o$ and $X_{RX}$ is $X_i$. Tau is the residence time for the polymer product in the purge bin. The tau factor may optionally be included and multiplied by $X_o/X_i$ to enable the purge efficiency of different purge bins, having different sizes and residence times, to be compared to each other on a relative basis. In FIG. 2, the two polymer product grades produced using Catalyst A were purged in a purge bin having a residence time of about 1.75 hours, while the two polymer product grades produced using Catalyst B were purged in a smaller purge bin having a residence time of only about 0.86 hours. The tau factor is not necessary to use of the model itself, and may be disregarded when one is not interested in comparing different purge bins on a relative basis. Without consideration of tau when comparing different purge bins, a larger purge bin will have better purge performance, all other factors being equal, simply by default of being larger.

As FIG. 2 shows, the polyethylene copolymer resin produced by Catalyst A purges relatively less efficiently than the polyethylene copolymer resin produced by Catalyst B. Thus, to achieve the same purge efficiency, the resins produced by Catalyst A will require a lower (S*P)/G factor. In other words, to achieve the same purge efficiency with these resins, one could increase G, the mass flow rate of purge gas in the purge bin and/or decrease S, the production rate of polymer in the reactor, or P, the absolute pressure in the purge bin. As can also be seen from FIG. 2, in both of the polyethylene copolymer resins produced, the C6 Inert species purge less efficiently than 1-hexene.

All numerical values are "about" or "approximately" the indicated value, and take into account experimental error and variations that would be expected by a person having ordinary skill in the art. Where units of measure are disclosed and claimed herein, this is solely for consistency in calculation. One of ordinary skill in the art would readily recognize that other units of measure could be applied and appropriately used in the measurements and formulas disclosed herein. While the foregoing is directed to embodiments of the present invention, other and further embodiments of the invention can be devised without departing from the basic scope thereof, and the scope thereof is determined by the claims that follow.

What is claimed is:

1. A method for purging a polymer product of volatiles, the method comprising:
    producing a polymer product comprising volatile species in a reactor;
    transferring the polymer product from the reactor to at least one purge bin;
    injecting a purge gas into the at least one purge bin to create a purged polymer product and a used purge gas;
    discharging the purged polymer product from the at least one purge bin to produce a discharged purged polymer product; and
    determining a relationship between purge efficiency, $X_o/X_i$, and (S*P)/G for one or more species of the volatile species purged from the polymer product, wherein:
    $X_o$ is the concentration in ppmw of the volatile species in the discharged purged polymer product;
    $X_i$ is the concentration in mol % of the volatile species in a gas phase of the reactor upstream of the at least one purge bin;
    S is a production rate in Klb polymer per hour of the reactor;
    P is an absolute pressure in psia within the at least one purge bin; and
    G is a mass flow rate in lb purge gas per hour in the at least one purge bin.

2. The method of claim 1, wherein the reactor comprises a fluidized bed reactor with a cycle gas loop, and $X_i$ is the concentration in mol % of the volatile species in the cycle gas.

3. The method of claim 1, wherein the reactor comprises a fluidized bed reactor, and $X_i$ is the concentration in mol % of the volatile species in a gas phase at a point within the fluidized bed reactor.

4. The method of claim 1, wherein the at least one purge bin comprises a top section and a bottom section.

5. The method of claim 1, further comprising recovering at least a portion of the used purge gas and recycling it to the at least one purge bin.

6. The method of claim 5, further comprising removing at least a portion of the volatile species comprising four or more carbon atoms from the used purge gas prior to recycling it to the at least one purge bin.

7. The method of claim 5, further comprising removing at least a portion of the volatile species comprising three or less carbon atoms from the used purge gas, wherein the removing occurs in a bottom section of the at least one purge bin.

8. The method of claim 1, further comprising determining a minimum fluidization velocity for the at least one purge bin, and maintaining a purge gas velocity within the at least one purge bin below the minimum fluidization velocity.

9. The method of claim 1, further comprising determining a relationship between purge efficiency, $X_o/X_i$, and (S*P*M)/G for one or more species of the volatile species purged from the polymer product and M is a molecular weight of the purge gas in lb/lb-mol.

10. The method of claim 9, further comprising adjusting at least one of the parameters S, P, M, or G to improve purge efficiency.

11. The method of claim 9, further comprising maintaining the value of (S*P)/G or (S*P*M)/G at or below a target value.

12. The method of claim 1, wherein the one or more volatile species is selected from the group consisting of 1-hexene, 3-methyl-2-pentene, cis- and trans-2-hexene, cis- and trans-3-hexene, 4-methyl-2-pentene, and 2-ethyl-1-butene.

13. The method of claim 1, further comprising injecting steam into the at least one purge bin.

14. The method of claim 1, wherein the purge gas is nitrogen.

15. The method of claim 1, further comprising heating the polymer product after it is discharged from the reactor and before it is transferred to the at least one purge bin.

16. The method of claim 1, wherein the polymer product comprises polyethylene.

* * * * *